United States Patent
Narayanaswamy et al.

(10) Patent No.: US 9,558,306 B2
(45) Date of Patent: Jan. 31, 2017

(54) RETIMING A DESIGN FOR EFFICIENT PARALLEL SIMULATION

(71) Applicant: Synopsys, Inc., Mountain View, CA (US)

(72) Inventors: Ramesh Narayanaswamy, Palo Alto, CA (US); Anil Nagori, Santa Clara, CA (US)

(73) Assignee: Synopsys, Inc., Mountain View, CA (US)

( * ) Notice: Subject to any disclaimer, the term of this patent is extended or adjusted under 35 U.S.C. 154(b) by 940 days.

(21) Appl. No.: 13/889,082

(22) Filed: May 7, 2013

(65) Prior Publication Data

US 2013/0297278 A1 Nov. 7, 2013

Related U.S. Application Data (60) Provisional application No. 61/643,470, filed on May 7, 2012.

(51) Int. Cl.
*G06F 17/50* (2006.01)
(52) U.S. Cl.
CPC ....... *G06F 17/5036* (2013.01); *G06F 17/5022* (2013.01); *G06F 17/5031* (2013.01); *G06F 2217/84* (2013.01)
(58) Field of Classification Search
CPC .............. G06F 17/5031; G06F 17/5036; G06F 17/5022; G06F 2217/84
USPC ...................................... 703/14, 19; 716/108
See application file for complete search history.

(56) References Cited

U.S. PATENT DOCUMENTS

| 2004/0225970 A1* | 11/2004 | Oktem | G06F 17/5059 716/114 |
| 2010/0125820 A1* | 5/2010 | Ispir | G06F 17/505 716/132 |
| 2012/0084742 A1* | 4/2012 | Ispir | G06N 3/006 716/101 |

OTHER PUBLICATIONS

Shu et al. "XNOR-Based Double-Edge-Triggered Flip-Flop for Two-phase Pipelines". IEEE. Feb. 2006. pp. 138-142.*

* cited by examiner

*Primary Examiner* — Eunhee Kim
(74) *Attorney, Agent, or Firm* — Fenwick & West LLP (57) ABSTRACT

An approach for simulating a circuit design partitions the circuit design into pipeline regions that include one or more pipeline levels. A path length is computed for each combinational region within a pipeline region to compute an achievable timing goal for each pipeline region. A target retiming goal is determined for the set of pipeline regions based on the computed achievable timing goals of the pipeline regions. A pipeline region is identified from the set of pipeline regions that does not satisfy the target timing goal. A measure of slack is computed for each pipeline level in the identified pipeline region. Using the computed slack, path lengths of combinational regions in the pipeline levels of the identified pipeline region are iteratively retimed. The resulting circuit design is simulated using the retimed path lengths if the retimed critical path of the pipeline region satisfies the target timing goal.

25 Claims, 5 Drawing Sheets

RETIMING A DESIGN FOR EFFICIENT PARALLEL SIMULATION

CROSS REFERENCE TO RELATED APPLICATION

This application claims priority under 35 U.S.C. §119(e) from U.S. Provisional Patent Application No. 61/643,470, filed on May 7, 2012, which is incorporated by reference herein in its entirety.

BACKGROUND

1. Technical Field

The present disclosure relates to retiming regions of an electronic circuit design to improve the efficiency of parallel simulation of the electronic circuit design.

2. Description of the Related Arts

Logic simulation of multi-core computing systems continues to become more complex and more important in the overall design process. Parallel logic simulation techniques claim to increase the performance of simulation task by taking advantage of concurrent read-write access of VLSI systems. Simulation of logic designs at gate, register transfer, and behavioral level of physical abstraction can employ different techniques, such as event driven and oblivious Parallel logic simulation techniques, like parallel event driven simulation, employ multiple time-ordered queues and partitions, and assign sections of a design into a time-ordered queue running on a processor. Generally, event driven simulation maintains a time ordered queue. Components with value changes are inserted into the queue which limits the computation to parts of the design that have to be updated. To operate properly, the time ordered queues need to be synchronized. Parallel event driven simulation, however, does not scale well beyond four or eight processors in practice. Synchronization cost between hundreds of processors can be very high and at each time step and each level of the logic under test. Moreover, the simulation work assignment may not be distributed evenly among the processors performing the simulation.

Other parallel logic simulation techniques, like oblivious simulation, evaluate all components of the logic design under test. That is, a component of the logic design is evaluated whether or not it has a value change or not. And in turn, the computation of a component is simpler compared to parallel event driven simulation because a value change of a component is not checked, and queue insertion is not performed. In further contrast to parallel event driven simulation, parallel oblivious simulation does not suffer work starvation in processors. Synchronization can be simpler since a single synchronization per level of the model is sufficient. Parallel oblivious simulation, however, may be less efficient for certain simulation task because parallel oblivious simulation performs redundant computation. For example, in cases where the number of value changes per design clock is low, parallel oblivious simulation is slower than serial event driven simulation.

SUMMARY

Embodiments include an approach for retiming a simulation model of an electronic circuit design. In one embodiment, the circuit design is partitioned into a set of pipeline regions comprising one or more pipeline levels. Each pipeline level is separated by a register and includes one or more combinational regions. For each combinational region, a path length is computed. Using the computed path lengths of the combinational regions in the corresponding pipeline region, an achievable timing goal computed for each pipeline region. A target retiming goal is determined for the set of pipeline regions based on the computed achievable timing goals of the set of pipeline regions. A pipeline region is identified from the set of pipeline regions that does not satisfy the target timing goal. A measure of pipeline level imbalance is computed for each pipeline level in the identified pipeline region. Based on the computed pipeline level imbalance, path lengths of one or more combinational regions in one or more pipeline levels in the identified pipeline region are modified. The resulting circuit design is simulated using the modified path lengths responsive to determining that the retimed path length of the combinational regions in the pipeline levels in the identified pipeline region satisfies the target timing goal.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. It should be noted that from the following discussion, alternative embodiments of the structures and methods disclosed herein will be readily recognized as viable alternatives that may be employed without departing from the principles of the present disclosure.

Parallel simulation, as referred to herein, executes a region consisting of one or more clocked regions by level. Each level is checked to determine whether any logic input of that level has an input change, and within in each level, each Aggregated Block is checked for a change to any input of the aggregated block. If the input change is true, the level and aggregated block is executed. The parallel simulation methods and systems of the disclosed embodiments are more efficient than other parallel simulation techniques because the levels, primitives, or aggregated blocks with an input change value true may be scheduled for execution and the levels, primitives, and aggregated blocks with an input change value false are not scheduled for simulation.

Creating a Simulation Model

In one implementation, a simulation model may be an interconnection of simple primitives. Simple primitives have roughly equal compute work, and communication requirements. The description of a logic design at gate level is commonly in terms of simple primitives such as and/or gates, flip flops, latches, etc. Register transfer level (RTL) and higher level descriptions can be decomposed into simple primitives such as adders, multipliers, multi-bit and/or, selectors, multi-bit flip flops, latches, etc.

Figure 1A:
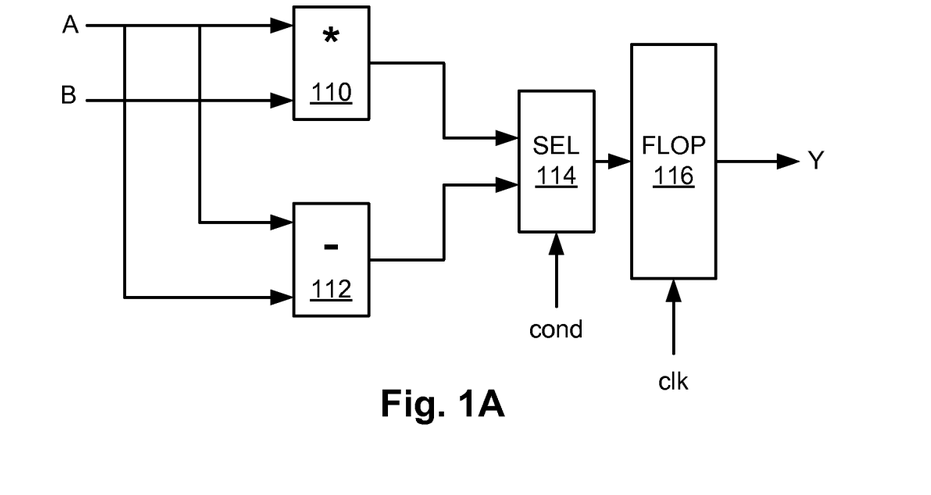
FIG. 1A is a simulation model of a circuit design, according to one embodiment.

For example the following RTL Description in Verilog HDL of the logic element shown in FIG. 1A can be decomposed into primitives.

```
always @(posedge clk)
    if(cond)
        Y = A * B;
    Else
        Y = A - B;
```

Decomposing RTL and higher level descriptions into primitives is generally known by those of ordinary skill in the art of logic circuit design. A description of a logic design may include hundreds of thousands of such statements. Primitives such as multipliers 110, subtractors 112, adders, etc. of an arbitrary width can be decomposed into components that have a fixed width such as 32 or 64 bits. Primitives such as selectors 114 that have arbitrary number of inputs can be decomposed into components that have a fixed number of inputs such as 3 or 5. Primitives may be combined with registers, such as flop 116 to execute logic functions as shown in FIG. 1A. Generally, an HDL description may be decomposed into simple primitives with suitable number of inputs, widths, and complexity of operation.

Creating a Simulation Sequence

In an embodiment, a simulation sequence triggers evaluation of one or more primitives based on input changes that can result in updating the values at the outputs of the primitives. For the example below one can construct the following simulation sequence.

Change On (A, B, or cond) Evaluate Region R1
Change On (posedge clk) Evaluate Region R2
An alternate sequence is—
Change On (A, or B) Evaluate Region R11
Change on (p, q, or cond) Evaluate SEL
Change on (posedge clk) Evaluate Region R2

Figure 1B:
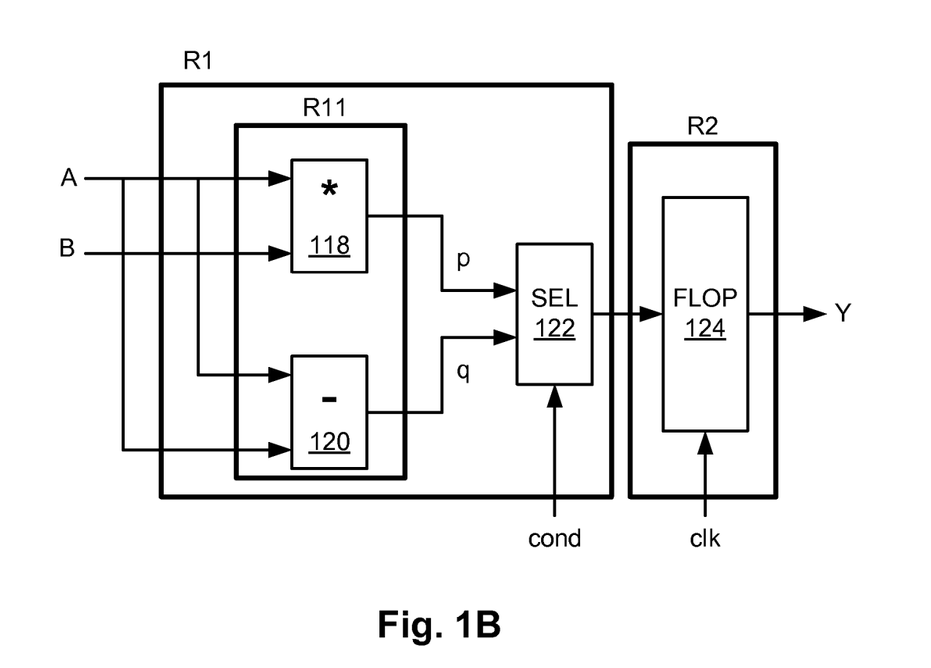
FIG. 1B is another simulation model of a circuit design, according to one embodiment.

Simulation sequences for a design are formed to create regions large enough to keep a parallel machine busy but not so large that unnecessary checking or execution is minimized. If a design has multiple clocks regions that correspond to each clock's flip flops/latches, the primitives that produce the inputs to the flip flops/latches can be formed into regions as shown in FIG. 1B. A first region R1 includes the primitives multiplier 118 and subtractor 120, which are included in region R11, and selector 122. The output of selector 122 forms the input to flip flop 124 included in region R2. In cases where a combinational cycle exists in the design an additional sequence can be incorporated by adding the following statement to the simulation sequence while(value change in the design region encompassing the combinational cycle) {Evaluate all regions that encompass the combinational cycle}

Selective Evaluation of a Region

In one example embodiment, a region comprises an interconnection of primitives which forms a hypergraph. A typical region is acyclic. In case a region has a combinational cycle the cycle is cut at an arbitrary point and a special primitive in a special region is inserted. This turns all regions into acyclic hypergraphs.

Figure 1C:
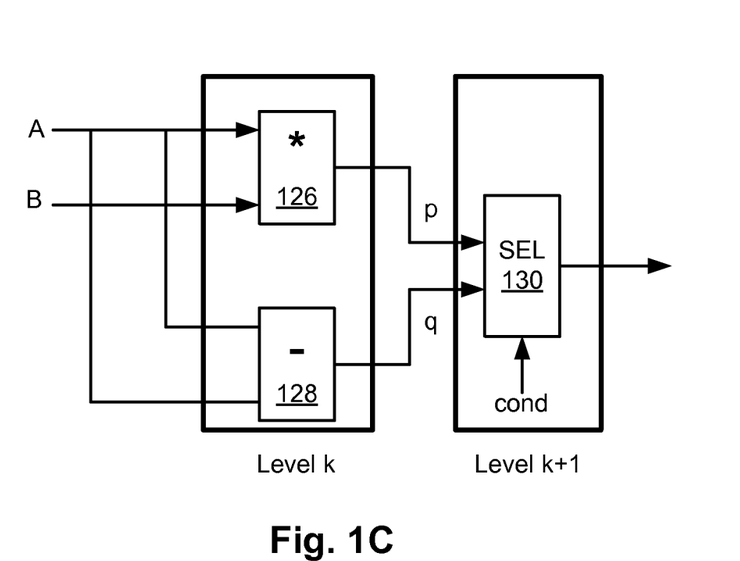
FIG. 1C is another simulation model of a circuit design, according to one embodiment.

An acyclic hypergraph can be levelized where each level has a set of primitives which do not have value dependencies. For example, as shown in FIG. 1C, in the levelized hypergraph below, the multiplier 126 and substractor primitives 128 do not have value dependency. The SEL primitive 130 included in level k+1 has value dependency on multiplier 126 and subtractor 128 primitives that are included the previous level k.

An example procedure for selective evaluation of a region is as follows:

```
For Level l = 0 to Last Level {
    if l has input change True {
        Reset input change of l;
        foreach Primitive p in l {
            Schedule it to a processor
        }
        Wait for all outputs to be written; // synchronization
    }
}
```

An example procedure for primitive evaluation is as follows:

```
If P has Input Change True {
    Reset input change of P;
    Read Inputs;
    Evaluate Operation of P to produce output value New Value;
    if(New Value != Old Value) {
        For each Primitive Q which depends on output of P {
            Set Input Change of Q's Level to True;
            Set Input change of Q to True;
            Write New Value to Q's input location;
        }
    }
}
```

This procedure avoids time/event ordered queues and synchronization of the queues. Additionally, there is a single synchronization for each level.

Aggregated Selective Evaluation

Figure 1D:
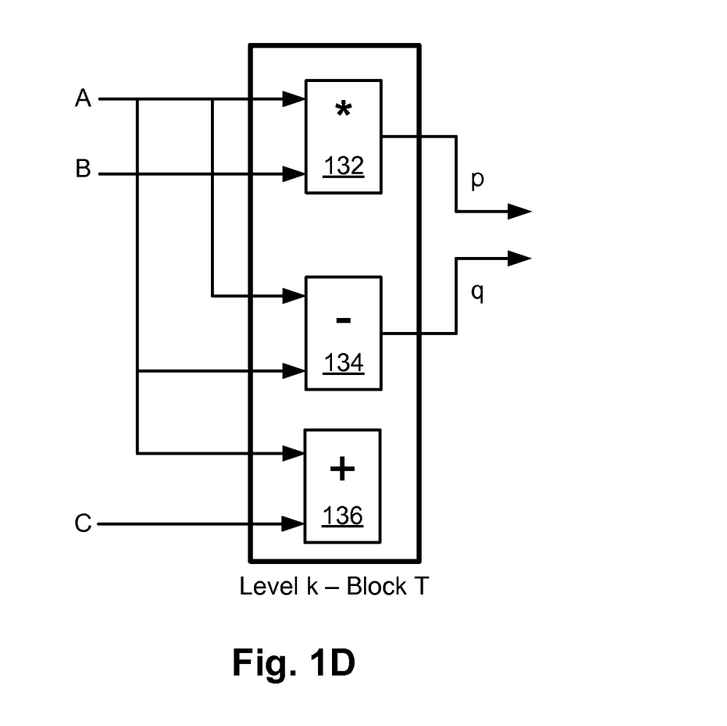
FIG. 1D is another simulation model of a circuit design, according to one embodiment.

The selective evaluation procedure above allows input change to be maintained for each primitive. By grouping a set of primitives in a level that share inputs into a block a single common input change value can be maintained for a group of primitives. In the example below, and as shown in FIG. 1D, a single common input change value can be maintained for the block that contains the multiplier 132, subtractor 134, and adder 136 primitives. When any input signals A, B, or C change the common input change value of the block will be set. When any of input signals A, B, or C change all the primitives in the block will be evaluated. An aggregated block may, in turn, be scheduled to a cluster of processors.

An example procedure for Evaluating an Aggregated Block on a cluster with k processors is as follows:

```
If Block T has Input change {
    foreach processor {
        Fetch (Total Inputs / k) to fast local memory from global memory;
```

```
        wait for the cluster to complete fetches;
        foreach assigned primitive {
            fetch primitive's operation, location of inputs, old value
        evaluate the primitive to produce new result value
        if(new result value is different from old value) {
            write output change value, and output value to local memory;
            update old value to the new result value;
        }
    }
}
wait for the cluster to complete writes;
For each of assigned set of outputs {
    if there is a output change {
        write output value to every aggregate block that reads this
        output and set the input change value for that aggregate block;
    }
}
```

This procedure balances the workload in three phases, fetching of input values, evaluation of primitives, and checking and writing output changes. This procedure also optimizes memory access by fetching input values for the aggregate block as a single contiguous region of memory. This procedure reduces redundant evaluation compared to oblivious simulation.

Optimizing for Memory Architecture

Global or system memory has high bandwidth that is fully utilized when clusters of processors write or read from adjacent locations. Memory bandwidth is conserved if a value read is used by all primitives that may require it. Memory bandwidth is conserved if a computed output value of a primitive is written to the fewest locations, preferably one location.

These objectives can be met if an evaluation region is partitioned into sub regions subject to the following constraints.

Minimize signal crossing between sub regions—most values will be produced and consumed within a sub region, when a signal crosses sub regions many consumers of the signal will be moved to the receiving sub region
 Keep number of primitives each sub region roughly equal sized
 Keep number of primitives in each level of each sub region roughly equal sized Such partitions can be obtained by applying multi constraint partitioning algorithms known to those of ordinary skill in the art of performing simulation of circuit designs. These algorithms can optimize for any well defined efficiently computable property. For instance, the number of primitives in a sub region that belong to a level L is efficient to compute and maintain. With this information the number of primitives from level L can be optimized to be roughly equal sized in each sub region. The same method can be applied to all levels of the model.

In each level each partitioned sub region is an aggregated block which has a minimized collection of input values. By allocating adjacent locations in memory to the input values of the aggregated block, the input value reads are optimized for memory bandwidth. Output values written from sub region S1 to sub region S2 will be assigned to adjacent locations to optimize for memory bandwidth. The overall approach helps to ensure that input value reads are done in a large block per sub region. Output value writes by a sub region will be fragmented smaller blocks because the output value writes will go to many sub regions. In one embodiment, given the choice between a single large input block or a single large output block, a single large input block is preferred. Since output changes at a low frequency and output writes happen on a change fragmented writes don't have a high cost. Single block read occurs on any input change to the region, and is fully optimized.

Exploiting SIMD Instructions

A processor cluster or a sub cluster may support single instruction, multiple data (SIMD) instructions. A SIMD instruction can efficiently compute 8/16/32 operations of the same primitive type; for example, sixteen addition operations in a single clock cycle of the CPU. To exploit SIMD instructions, a single primitive type or a small set of primitive types can be allocated to a cluster or sub cluster. The number of primitive types in a sub region can be reduced by the following means:

Limit the number of primitive types in model creation to the minimum required
 Add a constraint to the multi constraint partitioner to minimize number of primitive types in each sub region. The number of primitive types in each sub region can be efficiently computed by means of a hash table in primitive type names to enable multi constraint partitioning
 In each level of a sub region sort the primitives by type to create small primitive type groups that can be implemented as SIMD instructions The number primitive types in a cluster or sub cluster is further reduced by limiting the model generation to a small number of primitives.

Improving Change Locality

Aggregate selective evaluation evaluates all the primitives in a block even if one input to the block has changed. It is desirable to have many primitives that change at the same simulated time in a single block to improve the efficiency of aggregate selective evaluation. In a design model, the same component may be used multiple times. By way of example, an eight core CPU will have eight usages of the component core. A primitive that performs an operation in core will appear eight times in CPU. For example, an incrementer that increments program counter by 1 in a core will appear eight times in CPU, say Incr_0, Incr_1, . . . , Incr_7. These groups of primitives are referred to herein as sibling primitives. Sibling primitives have a high probability of having input changes at the same time.

The Design model of CPU will be a netlist of primitives. This netlist can be pre-processed to cluster sibling primitives into single meta primitives. This pre-processed netlist can then be partitioned for Memory locality and SIMD clustering. This pre-clustering ensures that (a) sibling nodes that are likely to change at the same simulated time are in the same block, and (b) more primitives of the same type are grouped into a block thus improving SIMD instruction usage.

Improving Utilization of a Parallel Architecture

A simulation model can be partitioned into running partly on a CPU and partly in a attached massively parallel architecture such as graphic processing unit (GPU). An example of the execution sequence of the simulation model may alternate between CPU and GPU. The number of independent primitives available in each level of the model determines the parallel efficiency of the GPU. A user typically runs thousands of tests on a single simulation model. Each of these tests forms an execution sequence as previously discussed.

By creating a simulation model that can run 2/4/ . . . copies of the simulation model at a time we can increase parallel efficiency of the model and achieve better utilization of the model.

The multi test simulation model is constructed in the following manner:

A single copy of the simulation model program

2/4/ . . . copies of the simulation model data, one for each test to be supported by the multi test simulation model The multi test simulation model is constructed in the following manner:

A single copy of the simulation model program

2/4/ . . . copies of the simulation model data, one for each test to be supported by the multi test simulation model The multi test simulation model is orchestrated as multiple tests, where the CPU portion of each test is a logical process, and a GPU server process provides the execution of GPU portion of all tests. In one example, a multi test model combines four tests at a time. In this example, the CPU portion of test0, test1, test2, test3 will execute. When each of test0-3 require GPU execution each CPU portion sends a request to the GPU Server.

Figure 2A:
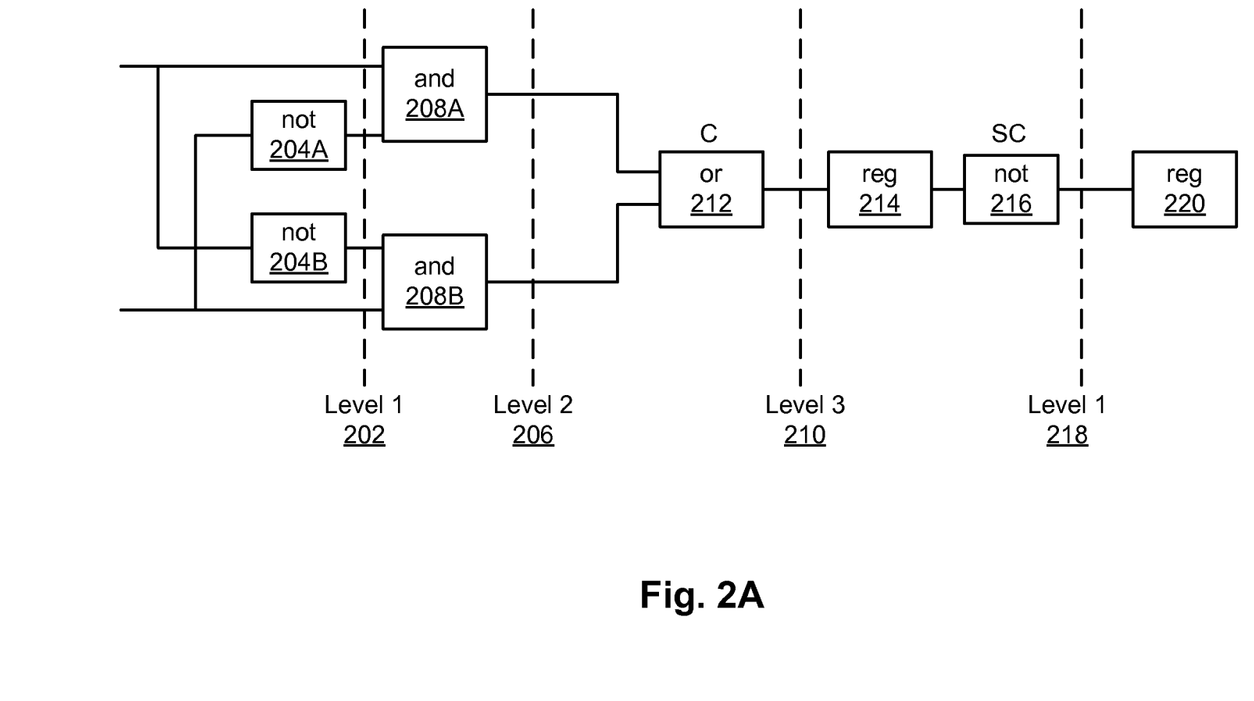
FIG. 2A is a simulation model of a pipeline region of a circuit design, according to one embodiment.

The GPU Server can implement one of many scheduling policies for executing the GPU requests:

1) wait for all four requests to arrive and launch a four wide simulation model to compute all four results
2) wait for at least two requests to arrive and launch a two wide simulation model
3) wait for a finite short duration and launch all available requests with required width of simulation model; this can be 1/2/4 wide Identifying Best Case Retiming Goal Parallel simulation as previously described, executes a region consisting of one or more clocked regions by level. When simulation the circuit design in FIG. 2A, the number of level to be executed in simulation is the maximum of the levels of the two stages, namely 3. A synchronous design may be retimed to reduce its critical path and minimize its register count. Generally, the critical path refers to the greatest path length of a combinational region of a pipeline region. For example, as shown in FIG. 2A, the critical path of a first region includes three levels, terminating at the output of the primitive 212. The first level 202 includes primitives 204A and 204B, the second level 206 includes primitives 208A and 208B, and the third level 210 includes primitive 212. The second region is separated from the first region by register 214, and includes a single level 218 ending at register 220.

Figure 2B:
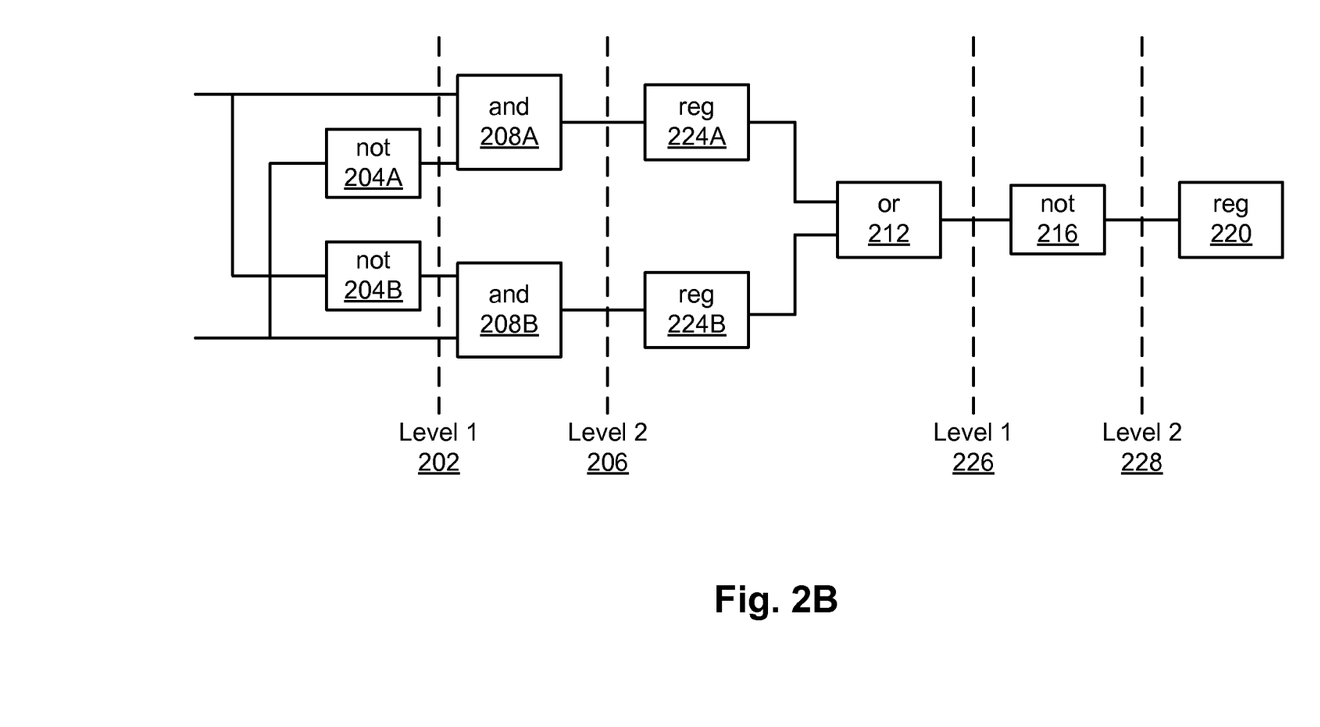
FIG. 2B is a simulation model of a pipeline region of a retimed circuit design of FIG. 2A, according to one embodiment.

In one embodiment, a region is levelized and the set of outputs of the region that are produced by the last level are the critical outputs of the region. As shown in FIG. 2A, the primitive 212 labeled C is the critical output. By removing the critical outputs, and recomputing the critical outputs the next critical outputs may be identified. In FIG. 2A, the primitive 216 labeled SC is the critical output. The best case goal of retiming is to reduce the last level to the level of SC. In this example the best case goal is to reduce levels to one. FIG. 2B shows a retimed versions of the circuit design in FIG. 2B, in which the number of levels to be executed is the maximum levels of the two stages, namely two. The first stage includes a first level 202, which includes primitives 204A and 204B, and the second level 206 includes primitives 208A and 208B, and the third level 210 includes primitive 212. The second stage is separated from the first stage by registers 224A and 224B. The second stage includes a first level 226, which includes primitive 212. The second level 228 of the second stage includes primitive 216 and ends a register 220. Thus, the objective of retiming for parallel simulations is to improve the efficiency of the parallel simulation.

In one embodiment, the circuit design is partitioned to create a pipelined view of the design to be retimed. In one implementation, the circuit design is partitioned into disjointed pipeline regions. The pipeline regions may include one or more combinational regions (CR) separated by a register. Registers directly connected to primary inputs and outputs are not moved for retiming because such an operation would affect the result generated by the circuit design.

After the circuit design is partitioned, the critical path for each combinational region in the pipeline is determined to compute the achievable retiming goal for each pipeline region. In one embodiment, one or more critical outputs are used to identify the successor or predecessor combinational regions. The successor combinational region of a set of critical outputs C is the sub graph that (a) takes as inputs IN the outputs of state primitives that take C as inputs, and (b) takes as outputs the first level of state primitives that are reachable from the inputs IN. A predecessor combinational region can be defined in a symmetric manner. Given a predecessor and successor combinational regions, CR1, and CR2, the levels of CR1 and CR2 can be made less than or equal to Ceiling ((CR1 's levels+CR2 's levels)/2) by retiming. For example, the pipeline region shown in FIG. 1A consists of two combinational regions—CR1 terminating a C with a critical path length three, and CR2 terminating at SC with a critical path length 1. The value of the achievable retiming goal of the pipeline region of FIG. 2A may be computed as follows: (3+1)/2=2. This value is the achievable retiming goal.

The goal of retiming is to achieve the best case retiming for a set of pipeline regions in a circuit design. That is, the best case retiming goal is the maximum of the values of the achievable retiming goals for a set of pipeline regions in the circuit design. The set of pipeline regions may include all pipeline regions in the circuit design or any subset of thereof. In one embodiment, a target retiming goal is set as the best case retiming goal or as the best case retiming goal within a tolerance range (e.g., plus or minus five percent of the best case retiming goal). A suitable tolerance range may be applied to the target retiming goal to allow for slightly more levels than the best case retiming goal but possibly at a lower cost in retiming.

For each pipeline region in the circuit design, the retiming system does nothing if for a pipeline region, all the path lengths of all combinational regions are less than or equal to the best case retiming goal. Otherwise, the retiming system performs register balancing reduce the critical path of the pipeline region to a value equal to the target retiming goal. Rebalancing is performed iteratively for each pipeline region in a set of pipeline regions under test that do not satisfy the target timing goal.

During register balancing, the retiming system computes the slack (i.e., pipeline level imbalance) at each pipeline level for each pipeline region identified from the set of pipeline regions that does not satisfy the target timing goal. Slack may be computed as the difference between an average path length of one or more combinational regions in an input path of the identified pipeline region and an average path length of one or more combinational regions in an output path of the identified pipeline region. Using the computed slack values, the simulation system generates, for each identified pipeline region, an ordered listing of pipeline levels. In one example, the pipeline level may be listed in descending order based on the absolute value of the corresponding slack value. The retiming system then identifies the pipeline level with the maximum absolute slack value for retiming. As will described in more detail in reference to FIG. 3, when the computed value of the slack is positive, the retiming system moves a register in the direction of the input of the pipeline region by a number of combinations levels on the left side of the register less than the number of levels corresponding to the target retiming goal. When the computed value of the slack is negative, the retiming system moves a register in the direction of the output path of the pipeline region by a number of combinational levels on the right side of the register less the number of levels corresponding to the target retiming goal.

This procedure can be repeated on the resultant simulation model for further reduction in the number of levels until the critical path of the identified pipeline region is less than or equal to the target retiming goal or no improvement is observed by the retiming system. This method provides the benefit of fewer levels in the region to be executed, and reduces the number of registers required to achieve reduction in levels.

Figure 3:
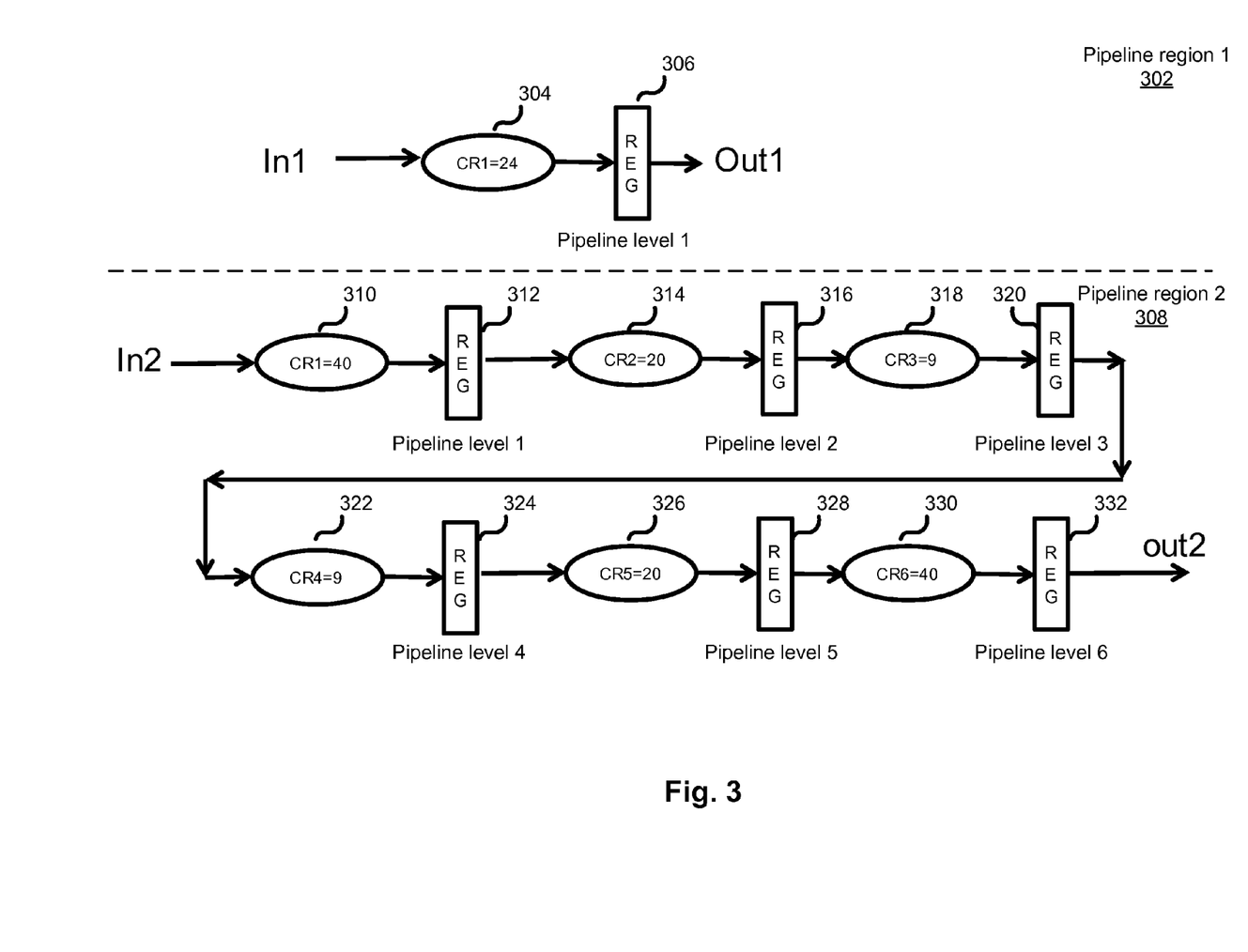
FIG. 3 is a pipelined view of multiple pipeline regions of a circuit design, according to one embodiment.

FIG. 3 shows pipelined view of multiple pipeline regions of a circuit design, according to one embodiment. The pipelined view includes two pipeline regions, pipeline region 1 302 and pipeline region 2 308. A first pipeline region 302 includes a single combinational region CR1 304 and a register 306. A second pipeline region 308 includes multiple combination regions CR1 310, CR2 314, CR3 318, CR4 322, CR5 326, CR6 330, and registers 312, 316, 320, 324, 328, and 332. Register 306 and register 332 may be moved as they are directly connected to a primary output. In this example, the achievable retiming goal for pipeline region 1 302 is computed as follows: 24/1=24, where 24 represents the number of combinational level included in CR1 304. Similarly, the achievable retiming goal for pipeline region 2 308 is computed as follows: (40+20+9+9+20+40)/6=23. Thus, the best case retiming goal is max (24,23)=24.

The retiming system performs rebalancing to reduce the critical paths of the identified pipeline to achieve the target retiming goal of 24 For pipeline region 1, pipeline level 1 is fixed (i.e., connected to the a primary output). Accordingly no rebalancing is performed for pipeline region 1. For pipeline region 2, slack is computed for each pipeline level as follows:

L1: 40−(20+9+9+20+40)5=20
L2: (40+20)/2−(9+9+20+40)/4=18
L3: (40+20+9)/3−(9+20+40)/3=0
L4: (9+9+20+40)/4−(40+20)/2=−18
L5: (20+9+9+20+40)5−40=−20
L6: Fixed The retiming system then sorts the pipeline levels of pipeline region based on the computed slack values. For example, the pipeline levels may be sorted in descending order from left to right L1, L5, L2, L4, L3. Pipeline level L1 is then retimed moving pipeline level 1 backward sixteen levels (40−24=16 levels). CR1 304 is now 24 and CR2 314 is 36. The slack of L1 may be recomputed as follows: 24−(36+9+9+20+40)/5=1. The critical path the pipeline region 2 is then reevaluated to determine whether the critical path is less than or equal to the target retiming goal. Here, after retiming pipeline level 1, the critical path is of pipeline region 2 remain forty levels at CR6 330. Rebalancing is repeated using the retimed pipeline level 1 resulting in the ordered listing of pipeline levels L5, L2, L4, L1, L3, computed in a manner as previously described. Pipeline level 5 is retimed by moving pipeline level 5 forward by sixteen (40−24=16 levels). CR6 330 is now 24 and CR5 326 is 36. The value of the slack of pipeline level 5 is computed as follows: (36+9+9+36+24)/5−24=−1. Rebalancing continues because the critical path is 36, which is greater than the target retiming goal of 24. Rebalancing is repeated using the retimed pipeline level 1 and pipeline level 5 resulting in the ordered listing of pipeline levels L2, L4, L1, L5, L3, computed in a manner as previously described. Pipeline level 2 is retimed by moving pipeline level 2 backward (36−24=12 levels). CR2 314 is 24 and CR3 318 is 9+12=23. The value of the slack of pipeline level 2 is computed as follows: (24+24)/2−(9+9+36+24)/4=24. Rebalancing continues because the critical path is 36, which is greater than the target retiming goal of 24. Rebalancing is repeated using the retimed pipeline levels 1, 2, and 5 resulting in the ordered listing of pipeline levels L4, L2, L1, L5, L3, computed in a manner as previously described. Pipeline level 4 is retimed by moving pipeline level 4 forward (36−24=12 levels). CR5 326 is 24 and CR4 322 is 9+12=23. The value of the slack of pipeline level 4 is computed as follows: (9+9+24+24)/4−(24+24)/2=−4. Rebalancing stops because the critical path is 24, which is satisfies the target retiming goal of 24.

Upon reading this disclosure, those of ordinary skill in the art will appreciate still additional alternative simulation methods and systems through the disclosed principles of the embodiments. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the spirit and scope of this disclosure.

What is claimed is:

1. A method for simulating a circuit design, the method comprising:
    partitioning the circuit design into a set of pipeline regions, one or more pipeline regions of the set of pipeline regions comprising one or more pipeline levels, each pipeline level separated by a register and includes one or more combinational regions;
    for each combinational region, computing a path length;
    for each pipeline region, computing an achievable timing goal based on the computed path lengths of combinational regions in the corresponding pipeline region, wherein achievable timing goal is a sum of the computed path lengths of combinational regions divided by a sum of a number of combinational regions in a corresponding pipeline region;
    determining a target retiming goal for the set of pipeline regions based on the computed achievable timing goals of the set of pipeline regions;
    identifying a pipeline region from the set of pipeline regions that does not satisfy the target timing goal;
    computing a measure of pipeline level imbalance for each pipeline level in the identified pipeline region;
    modifying path lengths of one or more combinational regions in one or more pipeline levels in the identified pipeline region based on the computed pipeline level imbalance; and
    simulating the circuit design using the modified path lengths responsive to determining a maximum modified path length of the one or more combinational regions in one or more pipeline levels in a pipeline region that satisfies the target timing goal.

2. The method of claim 1, wherein identifying a pipeline region from the set of pipeline regions that does not satisfy the target timing goal comprises:

determining whether a maximum path length of the one or more combinational regions in one or more pipeline levels in the set of pipeline regions satisfies the target timing goal.

3. The method of claim 1, wherein target timing goal is a maximum of the achievable timing goals of the set of pipeline regions.

4. The method of claim 1, wherein computing a measure of pipeline level imbalance for each pipeline level in the identified pipeline region comprises:
computing a difference between an average path length of one or more combinational regions in an input path of the identified pipeline region and an average path length of one or more combinational regions in an output path of the identified pipeline region from the set of pipeline regions that does not satisfy the target timing goal.

5. The method of claim 4, further comprising:
generating an ordered listing of the measure of pipeline level imbalance based on the computed measures of pipeline level imbalance for each pipeline level in the identified pipeline region from the set of pipeline regions that does not satisfy the target timing goal; and
selecting a pipeline region from the set of pipeline regions having the greatest computed measure of pipeline level imbalance for retiming.

6. The method of claim 1, wherein modifying path lengths of one or more combinational regions in one or more pipeline levels in the identified pipeline region based on the computed pipeline level imbalance comprises:
reducing an input path length of one or more combinational regions in one or more pipeline levels in the identified pipeline region from the set of pipeline regions that does not satisfy the target timing goal by a number of levels corresponding to the target timing goal; and
increasing an output path length of the one or more combinational regions in one or more pipeline levels in the identified pipeline region from the set of pipeline regions that does not satisfy the target timing goal by a number of levels corresponding to the target timing goal.

7. The method of claim 1, wherein modifying path lengths of one or more combinational regions in one or more pipeline levels in the identified pipeline region from the set of pipeline regions that does not satisfy the target timing goal based on the computed pipeline level imbalance comprises:
reducing an output path length of one or more combinational regions in one or more pipeline levels in the identified pipeline region from the set of pipeline regions that does not satisfy the target timing goal by a number of levels corresponding to the target timing goal; and
increasing an input path length of the one or more combinational regions in one or more pipeline levels in the identified pipeline region from the set of pipeline regions that does not satisfy the target timing goal by a number of levels corresponding to the target timing goal.

8. The method of claim 1, further comprising not modifying path lengths of one or more combinational regions in one or more pipeline levels of pipeline regions that satisfy the target timing goal.

9. A method for simulating a circuit design, the method comprising:
identifying a pipeline region from a circuit design, the identified pipeline region comprising one or more pipeline levels, each pipeline level separated by a register and including one or more combinational regions;
computing a path length for each combinational region;
determining a target retiming goal for the identified pipeline region based on one or more of a group consisting of the computed path lengths, additional combinational regions in the circuit design, and any combination thereof;
responsive to the identified pipeline region not satisfying the target timing goal, computing a measure of pipeline level imbalance for each pipeline level in the identified pipeline region, the measure of pipeline level imbalance corresponding to a difference between an average path length of one or more combinational regions in an input path of the pipeline region and an average path length of one or more combinational regions in an output path of the pipeline region;
modifying path lengths of one or more combinational regions in one or more pipeline levels in the identified pipeline region based on the computed measure of pipeline level imbalance; and
simulating the circuit design using the modified path lengths responsive to determining a maximum modified path length of the one or more combinational regions in one or more pipeline levels in the identified pipeline region that satisfies the target timing goal.

10. The method of claim 9, wherein modifying path lengths of one or more combinational regions in one or more pipeline levels in the identified pipeline region based on the computed pipeline level imbalance comprises:
reducing an input path length of one or more combinational regions in one or more pipeline levels in the identified pipeline region by a number of levels corresponding to the target timing goal; and
increasing an output path length of the one or more combinational regions in one or more pipeline levels in the identified pipeline region by a number of levels corresponding to the target timing goal.

11. The method of claim 9, wherein modifying path lengths of one or more combinational regions in one or more pipeline levels in the identified pipeline region based on the computed pipeline level imbalance comprises:
reducing an output path length of one or more combinational regions in one or more pipeline levels in the identified pipeline region by a number of levels corresponding to the target timing goal; and
increasing an input path length of the one or more combinational regions in one or more pipeline levels in the identified pipeline region by a number of levels corresponding to the target timing goal.

12. A non-transitory computer-readable storage medium including instructions for simulating a circuit design that, when executed by a processor, cause the processor to:
partition the circuit design into a set of pipeline regions, the pipeline regions comprising one or more pipeline levels, each pipeline level separated by a register and including one or more combinational regions;
for each combinational region, compute a path length;
for each pipeline region, compute an achievable timing goal based on the computed path lengths of combinational regions in the corresponding pipeline region;
determine a target retiming goal for the set of pipeline regions based on the computed achievable timing goals of the set of pipeline regions;

identify a pipeline region from the set of pipeline regions that does not satisfy the target timing goal;

compute a measure of pipeline level imbalance for each pipeline level in the identified pipeline region from the set of pipeline regions that does not satisfy the target timing goal, the measure of pipeline level imbalance corresponding to a difference between an average path length of one or more combinational regions in an input path of the identified pipeline region from the set of pipeline regions that does not satisfy the target timing goal and an average path length of one or more combinational regions in an output path of the identified pipeline region from the set of pipeline regions that does not satisfy the target timing goal;

modify path lengths of one or more combinational regions in one or more pipeline levels in the identified pipeline region from the set of pipeline regions that does not satisfy the target timing goal based on the computed pipeline level imbalance; and simulate the circuit design using the modified path lengths responsive to determining a maximum modified path length of the one or more combinational regions in one or more pipeline levels in the identified pipeline region, from the set of pipeline regions that does not satisfy the target timing goal, satisfies the target timing goal.

13. The non-transitory computer-readable storage medium of claim 12, wherein instructions for simulating a circuit design that, when executed by the processor, cause the processor to identify a pipeline region from the set of pipeline regions that does not satisfy the target timing goal comprises:

determining whether a maximum path length of the one or more combinational regions in one or more pipeline levels in the identified pipeline region, from the set of pipeline regions that does not satisfy the target timing goal, satisfies the target timing goal.

14. The non-transitory computer-readable storage medium of claim 12, further comprising instructions that cause the processor to:

generate an ordered listing of the measure of pipeline level imbalance based on the computed measures of pipeline level imbalance for each pipeline level in the identified pipeline region from the set of pipeline regions that does not satisfy the target timing goal; and select a pipeline region from the set of pipeline regions having the greatest computed measure of pipeline level imbalance for retiming.

15. The non-transitory computer-readable storage medium of claim 12, wherein instructions for simulating a circuit design that, when executed by the processor, cause the processor to modify path lengths of one or more combinational regions in one or more pipeline levels in the identified pipeline region from the set of pipeline regions that does not satisfy the target timing goal based on the computed pipeline level imbalance comprises:

reducing an input path length of one or more combinational regions in one or more pipeline levels in the identified pipeline region from the set of pipeline regions that does not satisfy the target timing goal by a number of levels corresponding to the target timing goal; and increasing an output path length of the one or more combinational regions in one or more pipeline levels in the identified pipeline region from the set of pipeline regions that does not satisfy the target timing goal by a number of levels corresponding to the target timing goal.

16. The non-transitory computer-readable storage medium of claim 12, wherein instructions for simulating a circuit design that, when executed by a processor, cause the processor to modify path lengths of one or more combinational regions in one or more pipeline levels in the identified pipeline region from the set of pipeline regions that does not satisfy the target timing goal based on the computed pipeline level imbalance comprises:

reducing an output path length of one or more combinational regions in one or more pipeline levels in the identified pipeline region from the set of pipeline regions that does not satisfy the target timing goal by a number of levels corresponding to the target timing goal; and increasing an input path length of the one or more combinational regions in one or more pipeline levels in the identified pipeline region from the set of pipeline regions that does not satisfy the target timing goal by a number of levels corresponding to the target timing goal.

17. A non-transitory computer-readable storage medium including instructions for simulating a circuit design that, when executed by a processor, cause the processor to:

identify a pipeline region from a circuit design, the pipeline region comprising one or more pipeline levels, each pipeline level separated by a register and including one or more combinational regions;

compute a path length for each combinational region;

determine a target retiming goal for the pipeline region based on one or more of a group consisting of the computed path lengths, additional combinational regions in the circuit design, and any combination thereof;

responsive to pipeline regions not satisfying the target timing goal, compute a measure of pipeline level imbalance for each pipeline level in the pipeline region, the measure of pipeline level imbalance corresponding to a difference between an average path length of one or more combinational regions in an input path of the pipeline region and an average path length of one or more combinational regions in an output path of the pipeline region;

modify path lengths of one or more combinational regions in one or more pipeline levels in the pipeline region based on the computed measure of pipeline level imbalance; and simulate the circuit design using the modified path lengths responsive to determining a maximum modified path length of the one or more combinational regions in one or more pipeline levels in a pipeline region that satisfies the target timing goal.

18. A method for simulating a circuit design, the method comprising:

partitioning the circuit design into a set of pipeline regions, one or more pipeline regions of the set of pipeline regions comprising one or more pipeline levels, each pipeline level separated by a register and includes one or more combinational regions;

computing, for each combinational region, a path length;

computing, for each pipeline region, an achievable timing goal based on the computed path lengths of combinational regions in the corresponding pipeline region;

determining a target retiming goal for the set of pipeline regions based on the computed achievable timing goals of the set of pipeline regions;

identifying a pipeline region from the set of pipeline regions that does not satisfy the target timing goal;

computing a difference between an average path length of one or more combinational regions in an input path of the identified pipeline region and an average path length of one or more combinational regions in an output path of the identified pipeline region from the set of pipeline regions that does not satisfy the target timing goal;

computing a measure of pipeline level imbalance for each pipeline level in the identified pipeline region using the computed difference;

modifying path lengths of one or more combinational regions in one or more pipeline levels in the identified pipeline region based on the computed measure of pipeline level imbalance; and simulating the circuit design using the modified path lengths responsive to determining a maximum modified path length of the one or more combinational regions in one or more pipeline levels in a pipeline region that satisfies the target timing goal.

19. The method of claim 18, wherein achievable timing goal is the sum of the computed path lengths of combinational regions divided by a sum of a number of combinational regions in the corresponding pipeline region.

20. The method of claim 18, wherein identifying a pipeline region from the set of pipeline regions that does not satisfy the target timing goal comprises:

determining whether a maximum path length of the one or more combinational regions in one or more pipeline levels in the set of pipeline regions satisfies the target timing goal.

21. The method of claim 18, wherein target timing goal is a maximum of the achievable timing goals of the set of pipeline regions.

22. The method of claim 18, further comprising:

generating an ordered listing of the measure of pipeline level imbalance based on the computed measures of pipeline level imbalance for each pipeline level in the identified pipeline region from the set of pipeline regions that does not satisfy the target timing goal; and selecting a pipeline region from the set of pipeline regions having the greatest computed measure of pipeline level imbalance for retiming.

23. The method of claim 18, wherein modifying path lengths of one or more combinational regions in one or more pipeline levels in the identified pipeline region based on the computed pipeline level imbalance comprises:

reducing an input path length of one or more combinational regions in one or more pipeline levels in the identified pipeline region from the set of pipeline regions that does not satisfy the target timing goal by a number of levels corresponding to the target timing goal; and increasing an output path length of the one or more combinational regions in one or more pipeline levels in the identified pipeline region from the set of pipeline regions that does not satisfy the target timing goal by a number of levels corresponding to the target timing goal.

24. The method of claim 18, wherein modifying path lengths of one or more combinational regions in one or more pipeline levels in the identified pipeline region from the set of pipeline regions that does not satisfy the target timing goal based on the computed pipeline level imbalance comprises:

reducing an output path length of one or more combinational regions in one or more pipeline levels in the identified pipeline region from the set of pipeline regions that does not satisfy the target timing goal by a number of levels corresponding to the target timing goal; and increasing an input path length of the one or more combinational regions in one or more pipeline levels in the identified pipeline region from the set of pipeline regions that does not satisfy the target timing goal by a number of levels corresponding to the target timing goal.

25. The method of claim 18, further comprising not modifying path lengths of one or more combinational regions in one or more pipeline levels of pipeline regions that satisfy the target timing goal.

* * * * *